Chris. Lidren,
Harvester-Rake.

Nº 74,836. Patented Feb. 25. 1868.

Witnesses.
W. C. Ashkettle
Theo Tusche

Inventor.
Chris Lindren
per Munn & Co.
attorneys.

United States Patent Office.

CHRISTOPHER LIDREN, OF LAFAYETTE, INDIANA, ASSIGNOR TO HIMSELF AND R. JACKSON, OF SAME PLACE.

Letters Patent No. 74,836, dated February 25, 1868.

IMPROVEMENT IN HARVESTER-RAKES.

*The Schedule referred to in these Letters Patent and making part of the same.*

TO ALL WHOM IT MAY CONCERN:

Be it known that I, CHRISTOPHER LIDREN, of Lafayette, in the county of Tippecanoe, and State of Indiana, have invented a new and improved Raking and Binding-Attachment for Reaping-Machines; and I do hereby declare that the following is a full, clear, and exact description thereof, which will enable those skilled in the art to make and use the same, reference being had to the accompanying drawings forming part of this specification.

This invention relates to a new and improved attachment for automatically raking and binding grain, and is designed to be applied to reaping-machines, and receive its motion from one of the driving-wheels thereof. In the accompanying sheet of drawings—

Figure 1:
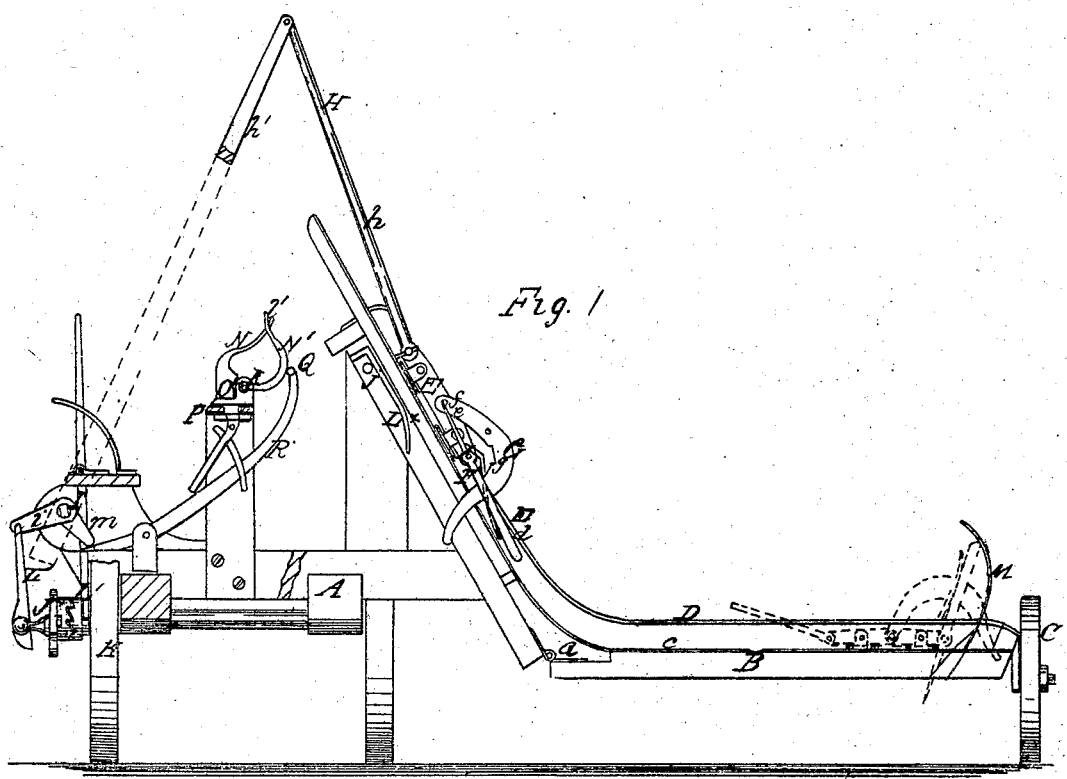
Figure 2:
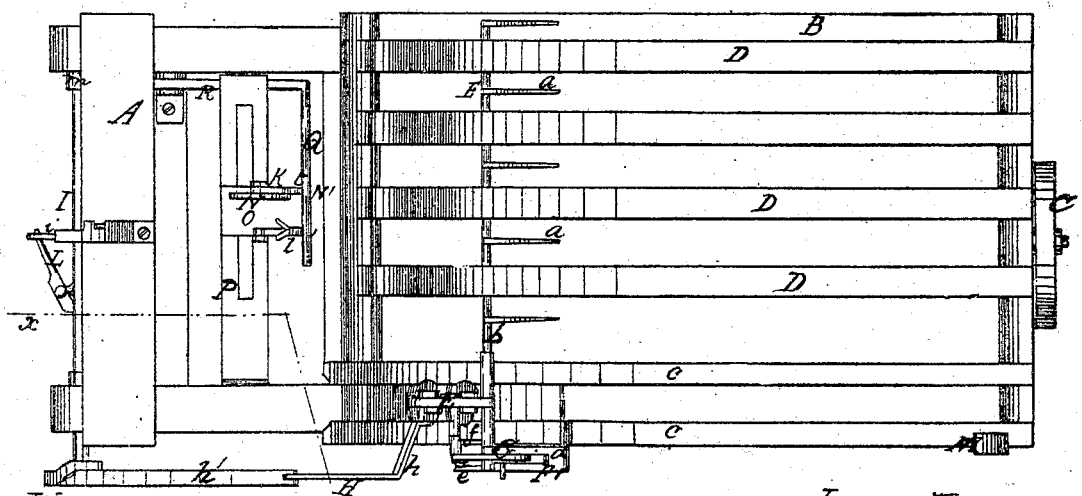

Figure 1 is a front sectional view of my invention, taken in the line $x$ $x$, fig. 2.

Figure 2, a plan or top view of the same.

Similar letters of reference indicate corresponding parts.

A represents the main frame of the machine, to which the platform B is connected by hinges $a$ $a$, the outer end of the platform being supported by a wheel, C. D represents a series of parallel metallic bars, which are quite thin, in order that they may spring or bend, and admit of the portion B of the platform rising and falling to conform to the inequalities of surface over which it may pass. The upper ends of the bars D are attached to the inner side of the main frame A, and the lower ends are attached to the cross-bar at the outer end of B. E represents a rake, the teeth $a$ of which are slightly curved, and are attached to a rod, $b$, one end of which has its bearing in a carriage, F, which works between guides $c$ $c$, attached to the rear of the platform and main frame. This carriage has a reciprocating movement given it, to cause the rake E to work back and forth over the platform, the teeth $a$, during the working movement of the rake, extending up between the bars D. On the end of the rake-head or rod $b$ there is secured a lever, F', one arm, $d$, of which is longer than the other one, $e$. The long arm is slotted, to admit of a curved bar, G, passing loosely through it, said bar being fitted loosely at one end on an arm, $f$, which projects from the carriage F, and having a notch, $g$, made in it to catch and hold the lever F', and consequently the rake-teeth $a$, when the latter are at work, or raking, or carrying up the grain from the platform. The reciprocating movement is given the rake E by means of the jointed arms $h$ $h'$, one arm, $h$, of which is attached to the carriage F, and the other arm, $h'$, attached to one end of a rock-shaft, I, at the outer side of the main frame A. This shaft I receives its motion from an arm, J, on the axle of the outer wheel K of the main frame, said arm being connected with an arm, $i$, on the rock-shaft, by a link, L, the lower end of which is attached to an adjustable wrist in the arm J. This arm J is fitted loosely on the axle of the wheel K, and may be connected to and disconnected from said axle by means of a clutch, L.

The operation of the rake is as follows: As it moves up the bars D, or towards the main frame, A, the teeth $a$ are elevated, so as to gather or rake up the grain, and when the rake has nearly reached the upper ends of the bars D, the lower end of the curved bar G comes in contact with a projection, L$^\times$, on the front side of the main frame, and the bar G is raised, so as to release the rake E. As soon as the arm F' is released from the notch in the curved bar G, the arm $e$ of the lever F' comes in contact with the pin $j$, which holds up the teeth until the grain is discharged. After arm $e$ has cleared the pin $j$, the rake-teeth fall between the bars D, by reason of their gravity. When the rake E nearly reaches the outer ends of the platform, the long arm $d$ of lever F comes in contact with a curved bar, M, which causes the rake-teeth $a$ to turn up until the lever F is caught by the notch in bar G. At this time the rake commences to move towards the main frame A, and again carries up the cut grain from the platform. The cut grain, as it drops from the rake at the upper ends of the bars D, falls between hooks N N', one of which, N, is attached to an adjustable plate, O, secured to a bar, P, in the main frame A, and the other, N', attached by a joint or pivoted connection, $k$, to the base of the hook N. The hook N' has two prongs, $l$ $l'$, the latter, $l'$, being forked at its end. The hook N' rests upon a bar, Q, which extends at right angles from a lever, R, pivoted in the main frame. This lever R is acted upon by a spur or arm, $m$, on the rock-shaft I, at such intervals as to raise the hook N', and cause the gavel to be compressed between the two hooks so that it may be bound with the greatest facility, the forked prong $l'$ being designed to hold one end of the band while the gavel is thrown upon it, so that the two ends of the band may be readily grasped by the operator or binder as the gavel is compressed.

The whole arrangement is extremely simple and efficient, and the parts operate smoothly, with but little friction, and consequently requiring but a moderate expenditure of power.

I claim as new, and desire to secure by Letters Patent—

1. The hinged platform B, in connection with the elastic metallic bars D, constructed, arranged, and applied in the manner substantially as and for the purpose herein set forth.

2. The reciprocating rake E, when operated from the wheel K of the main frame, through the medium of the jointed arms $h$ $h'$, rock-shaft I, link L, and the slotted arm J on the axle of wheel K, all arranged substantially as shown and described.

3. The carriage F, in which the rake-head or rod $b$ is fitted, in combination with the lever F', curved bar G, projection L, pin J, and the curved bar M, all arranged to operate or adjust the rake, substantially as set forth.

4. The hooks N N', arranged as shown, and operated from the rock-shaft I, through the medium of the lever R, and the arm $m$ on the rock-shaft, all arranged substantially as specified.

CHRISTOPHER LIDREN.

Witnesses:
  LYMAN BEEMAN,
  GEO. T. TEN EYCK.